United States Patent [19]

Wheaton et al.

[11] Patent Number: 4,491,570

[45] Date of Patent: Jan. 1, 1985

[54] REMOVAL OF ARSENIC FROM HYDROGEN FLUORIDE

[75] Inventors: Gregory A. Wheaton, Logan Township, Gloucester County, N.J.; David M. Gardner, Worcester Township, Montgomery County, Pa.

[73] Assignee: Pennwalt Corporation, Philadelphia, Pa.

[21] Appl. No.: 606,484

[22] Filed: May 3, 1984

[51] Int. Cl.$^3$ ............................................. C01B 7/22
[52] U.S. Cl. ..................................... 423/484; 423/483
[58] Field of Search ................................. 423/483, 484

[56] References Cited

U.S. PATENT DOCUMENTS

| 3,166,379 | 1/1965 | Bradley et al. | 423/484 |
| 3,689,370 | 9/1972 | Osaka et al. | 423/484 |
| 4,032,621 | 6/1977 | Meadows | 423/483 |
| 4,083,941 | 4/1978 | Jayawant et al. | 423/484 |

FOREIGN PATENT DOCUMENTS

| 1181178 | 11/1964 | Fed. Rep. of Germany | 423/483 |
| 38-6880 | 2/1961 | Japan | 423/483 |
| 1026271 | 4/1966 | United Kingdom | 423/483 |
| 1332968 | 10/1973 | United Kingdom | 423/483 |
| 379533 | 7/1973 | U.S.S.R. | 423/484 |
| 763251 | 9/1980 | U.S.S.R. | 423/483 |

Primary Examiner—John Doll
Assistant Examiner—Wayne A. Langel

[57] ABSTRACT

Arsenic impurities are removed from anhydrous hydrogen fluoride by treating the hydrogen fluoride with elemental chlorine and anhydrous hydrogen chloride or a fluoride salt or both and then separating the purified anhydrous hydrogen fluoride, preferably by distillation, from the nonvolatile arsenic compounds.

12 Claims, No Drawings

REMOVAL OF ARSENIC FROM HYDROGEN FLUORIDE

BACKGROUND OF THE INVENTION

The present invention relates to a process for removing arsenic impurities from anhydrous hydrogen fluoride. More specifically, this invention relates to a process for removing arsenic impurities from anhydrous hydrogen fluoride at a substantially increased rate by treating anhydrous hydrogen fluoride with elemental chlorine in combination with either anhydrous hydrogen chloride or a fluoride salt.

Anhydrous hydrogen fluoride is manufactured by heating a mixture of fluorspar and sulfuric acid. The main impurities in anhydrous hydrogen fluoride produced by this method are water, sulfuric acid, fluorosulfonic acid, silicon tetrafluoride, fluorosilicic acid, hydrogen sulfide, and sulfur dioxide. These impurities are conveniently removed by fractional distillation and the resulting anhydrous hydrogen fluoride typically has a purity of about 99.8% or better. Minor amounts of certain other undesirable impurities such as arsenic, phosphorus, and sulfur are usually present in anhydrous hydrogen fluoride produced by this method. The amounts of the impurities such as arsenic which are present in the anhydrous hydrogen fluoride depend on the amounts of these impurities in the fluorspar from which the anhydrous hydrogen fluoride is produced. The presence of these minor impurities, especially arsenic, in the anhydrous hydrogen fluoride is highly undesirable in many applications. Anhydrous hydrogen fluoride is used in the refining and chemical manufacturing industries and arsenic impurities in the hydrogen fluoride can poison catalysts and contaminate the manufactured products which adversely affects the product quality. In the electronics industry, aqueous solutions of hydrogen fluoride are used as cleaning agents and etchants in the manufacture of semi-conductors, diodes, and transistors. A high degree of purity and extremely low levels of impurities such as arsenic are required to prevent contamination of the surface of these electronics industry products which adversely affects their performance.

PRIOR ART

General processes have been proposed for removal of minor impurities, especially arsenic, from anhydrous hydrogen fluoride. Among these are processes which involve multiple fractional distillations in fluoroplastic equipment. U.S. Pat. No. 3,166,379 discloses a method whereby highly pure aqueous hydrogen fluoride is produced by treatment of contaminated aqueous hydrogen fluoride with an oxidizing agent, such as permanganate or chromate salts, or with both an oxidizing agent and a halogen, preferably iodine, to convert arsenic and phosphorus impurities to nonvolatile compounds. U.S. Pat. No. 3,689,370 discloses a process of adding an inorganic ferrous salt to anhydrous hydrogen fluoride after treatment with permanganate or chromate salts to reduce excess oxidizing agents. U.S. Pat. No. 4,032,621 discloses a similar process using hydrogen peroxide as a metal free reducing agent. U.S. Pat. No. 4,083,941 discloses the use of hydrogen peroxide to oxidize arsenic impurities in anhydrous hydrogen fluoride to nonvolatile arsenic compounds which are separated by distillation of the anhydrous hydrogen fluoride.

STATEMENT OF THE INVENTION

In accordance with this invention, a process for removing arsenic impurities from anhydrous hydrogen fluoride comprises intimately contacting said anhydrous hydrogen fluoride for an effective period of time and in effective amounts with elemental chlorine and a substance selected from the group consisting of anhydrous hydrogen chloride, a fluoride salt and mixtures thereof, and then recovering anhydrous hydrogen fluoride with a substantially reduced amount of arsenic impurities. The preferred method of recovering the purified anhydrous hydrogen fluoride is by distillation wherein the chlorine and hydrogen chloride are first separated and then the anhydrous hydrogen fluoride comes off at a higher temperature leaving the nonvolatile arsenic compounds.

DETAILED DISCUSSION OF THE INVENTION

The process of this invention removes substantially all arsenic impurities, ie, arsenic or arsenic compounds, whether present in high or low concentrations, from anhydrous hydrogen fluoride. Reference herein to "anhydrous hydrogen fluoride" means hydrogen fluoride that is at least 95% by weight hydrogen fluoride and preferably at least 98% by weight hydrogen fluoride.

The concentration of arsenic impurities in commercial anhydrous hydrogen fluoride depends primarily on the source of the fluorspar used in manufacturing the hydrogen fluoride and can exceed 0.05%, but is usually less than about 0.01%, based on the weight of the hydrogen fluoride. Thus, the stoichiometric amount of chlorine and hydrogen chloride or fluoride salt required to oxidize the arsenic impurities to nonvolatile species is not large. However, a relatively large excess of both chlorine and hydrogen chloride has been found to be necessary in order to achieve a substantial reduction in concentration of arsenic impurity in the product anhydrous hydrogen fluoride within a reasonable process time.

The effective amounts of both elemental chlorine and anhydrous hydrogen chloride required to be used in the process of this invention depend on the amount of arsenic impurities present in the hydrogen fluoride. The amounts of both chlorine and hydrogen chloride effectively dissolved in the liquid anhydrous hydrogen fluoride will be determined by the partial pressure of chlorine and hydrogen chloride in the system at any given operating temperature and as such can be fixed by regulating the partial pressure of each component above the surface of the liquid anhydrous hydrogen fluoride. Regulation of partial pressure is accomplished by adjusting the amount of chlorine or anhydrous hydrogen chloride in the system or the temperature of the system. The amounts of chlorine and hydrogen chloride which can be used in the process of this invention each range from about 0.5% to over 6%, based on the weight of the anhydrous hydrogen fluoride. The preferred amounts of elemental chlorine and anhydrous hydrogen chloride to be used in this process each range from about 1% to about 4%, based on the weight of the anhydrous hydrogen fluoride. In general, differential partial pressures of at least 10 psia above the vapor pressure of the liquid anhydrous hydrogen fluoride are required for both chlorine and hydrogen chloride in the system in order to sufficiently reduce the concentration of the arsenic impurities, although lower partial pressures of each can be employed over extended contact times. The upper limits of chlorine and hydrogen chloride partial pressures is limited only by convenience and economy. The preferred differential partial pressures of both chlorine and hydrogen chloride are, separately, 10 psi to 45 psi above the vapor pressure of the liquid anhydrous hydrogen fluoride.

What is meant by anhydrous hydrogen chloride as used herein is anhydrous hydrogen chloride and sources of anhydrous hydrogen chloride including, for example, aqueous hydrochloric acid, or a substance which will react in the presence of anhydrous hydrogen fluoride to produce hydrogen chloride. Such substances include, for example: phosgene ($COCl_2$); organic and inorganic acid chlorides such as acetyl chloride ($CH_3COCl$), methanesulfonyl chloride ($CH_3SO_2Cl$), benzoyl chloride ($C_6H_5COCl$), sulfonyl chloride ($SO_2Cl_2$), sulfinyl chloride ($SOCl_2$), phosphoryl chloride ($POCl_3$), nitryl chloride ($NO_2Cl$) and nitrosyl chloride ($NOCl$); ammonium chloride; quaternary ammonium chlorides such as tetramethylammonium chloride and tetraethylammonium chloride; and metal chlorides such as sodium chloride, potassium chloride, boron trichloride, aluminum trichloride, calcium chloride, magnesium chloride, barium chloride, mercury (I) and mercury (II) chlorides, copper (I) and copper (II) chlorides, silver chloride and Group VIII metal chlorides such as iron (II) and iron (III) chlorides, nickel chloride, cobalt chloride, and palladium chloride. The amount of such aforementioned substances to be used is that required to produce and/or maintain the desired hydrogen chloride partial pressure in the system. The preferred source of anhydrous hydrogen chloride used in the process of this invention is anhydrous hydrogen chloride.

Anhydrous hydrogen chloride, whatever the source, is the preferred material to be used in combination with elemental chlorine in this invention, based on the greater reduction in effective time to remove arsenic.

The process of this invention may be carried out in the presence of a fluoride salt. The addition of a fluoride salt to the process of this invention results in an increase in the rate at which the arsenic impurities are converted to nonvolatile arsenic compounds. Fluoride salts which may be added in the process of this invention include, for example: alkali metal fluorides such as sodium fluoride and potassium fluoride; alkaline earth metal fluorides, such as magnesium fluoride and calcium fluoride; silver (I) fluoride; other metal fluorides which can form stable compounds with arsenic (II) fluoride as reported by Filec, Gantar and Holloway in the Journal of Fluorine Chemistry, 19, 485–500 (1982) such as manganese (II) fluoride, cobalt (II) fluoride, nickel fluoride, cadmium fluoride, tin (II) fluoride, iron (II) fluoride, copper (II) fluoride, mercury (II) fluoride, and lead (II) fluoride; ammonium fluoride; and fluoride salts of amines such as tetraethylammonium fluoride. The fluoride salts added in the process of this invention may be introduced as the fluoride salt or the fluoride salt may be generated in situ by the reaction of an added compound other than a fluoride salt with hydrogen fluoride. Such compounds include, for example: halide salts such as chloride, bromide or iodide salts; oxides or hydroxides; carbonates; sulfides; sulfate salts; nitrate salts; and acetate salts. The fluoride salt employed in the process of this invention may be appreciably soluble in anhydrous hydrogen fluoride such as potassium fluoride or essentially insoluble in anhydrous hydrogen fluoride such as calcium fluoride. The preferred fluoride salt to be used in the process of this invention is potassium fluoride.

The effective amount of the aforementioned fluoride salt which may be added in the process of this invention to facilitate the formation of nonvolatile arsenic compounds will be dependent upon the amount of arsenic impurities present in the anhydrous hydrogen fluoride. It has been found necessary to employ an amount of fluoride salt at least from equimolar with the amount of arsenic impurity present to five times the amount of arsenic impurity present in the anhydrous hydrogen fluoride on a mole basis in order to appreciable increase the rate at which the arsenic impurities are converted to nonvolatile arsenic compounds. Preferably, the fluoride salt is present in an amount ranging from 0.01 to 0.75% based on the weight of the anhydrous hydrogen fluoride.

The oxidation reaction of the present invention may take place at ambient temperatures or from temperatures of 0° to 100° C., preferably at from ambient temperatures to about 30° C. The treatment may be conducted with the hydrogen fluoride under reflux or nonreflux conditions. Agitation by some suitable means may be employed but is not necessary for the process of this invention. Since the effective period of time required to sufficiently reduce the amount of arsenic impurities is dependent upon the temperature at which the process of this invention is operated, the partial pressures of both chlorine, hydrogen chloride (when used), and the amount of fluoride salt added, it will be understood that the contact time can vary widely. At higher temperatures, higher chlorine and hydrogen chloride partial pressures, and in the combined presence of a fluoride salt the contact time will be very low, for example, 30 minutes to one hour. Similarly at lower temperatures, low chlorine partial pressure with low amounts of fluoride salt and in the absence of hydrogen chloride, the contact time can be very long, for example, several days. A long contact time is undesirable in a process and it is preferred to be less than 1 hour.

The variables of temperature, chlorine partial pressure, hydrogen chloride partial pressure, contact time, and the amount of fluoride salt added are statistically interactive. The optimum combination of these variables can be determined by statistical analysis of controlled experiments to obtain a desired balance of operating parameters.

The process of this invention is directed primarily to the preparation of very high purity anhydrous hydrogen fluoride for critical uses such as those in the electronics field, but it also results in the production of technical grade hydrogen fluoride of improved quality.

EXAMPLES

In the following examples which further illustrate the process of this invention, all references to percentages are by weight based on the anhydrous hydrogen fluoride unless otherwise indicated. The commercial anhydrous hydrogen fluoride used in all of the following examples was analyzed for arsenic and was found to contain about 565 ppm of arsenic based on 100% anhydrous hydrogen fluoride. Arsenic was determined using the method detailed in "Standard Methods for the Examination of Water and Wastewater", 15th Ed., M. A. H. Franson, Ed., American Public Health Association, Washington, D.C., 1980, pp. 174–7. Aqueous samples were acid-digested, then the arsenic impurities were reduced to arsine, the arsine was absorbed in a pyridine solution of silver diethyldithiocarbamate to form a colored complex, and the light absorbance at 535 nm was measured spectrophotometrically.

EXAMPLE 1

58.36 gms of commercial anhydrous hydrogen fluoride (HF), 2.56 gms of chlorine (4.39%) and 2.29 gms of anhydrous hydrogen chloride (3.92%) were charged to a mild steel cylinder having an outer diameter of 3 inches, a height of 5 inches and a wall thickness of 1/8 inch. The cylinder was equipped with a 316 stainless steel needle valve. Prior to charging the above stated chemicals to the cylinder, it was cooled in an ice water bath to 0° C. After charging, the mixture in the cylinder was heated at 70° C. for one hour and then cooled to 23° C. over 30 minutes. The chlorine, hydrogen chloride and the majority (48.03 gms) of anhydrous HF were transferred in the vapor-phase over a period of 127 minutes through a 1/4 inch O.D. Teflon line attached to the needle valve into two polyethylene gas scrubbing towers connected in series and containing 100 mls and 50 mls, respectively, of distilled water. After absorption by the distilled water, the contents of the two scrubbing towers was combined and the resulting aqueous HF analyzed for arsenic. The results of the analysis are given hereinafter in Table 1.

As a comparison, experiments A and B were made using chlorine alone for the removal of arsenic compounds. In A, 77.24 gms of commercial anhydrous HF was charged to the cooled cylinder described above along with 0.84 gms of chorine (1.05%). The cylinder was then warmed to 23° C. in a water bath and was allowed to stand with occasional, gentle shaking over a two hour period. The chlorine and 45.4 gms of HF were transferred over a two hour period to distilled water as described in Example 1 and the aqueous HF was analyzed for arsenic, the results being reported in Table 1.

In experiment B, a procedure similar to A was used where 60.43 gms of commercial anhydrous HF and 2.97 gms of chlorine (4.91%) were charged to the cooled cylinder. The HF and chlorine were allowed to stand at 23° C. with occasional shaking over 42 hours. The chlorine and 38.62 gms of HF were transferred to water as described in Example 1 and the aqueous HF analyzed for arsenic, the results being reported in Table 1.

In experiment C, 0.17 gms of anhydrous potassium fluoride (0.29%) was charged to the cylinder of Example 1 before cooling. After cooling as in Example 1, 58.49 gms of commercial anhydrous HF and 2.26 gms of anhydrous hydrogen chloride (3.86%) were charged to the cylinder. The cylinder was held in a water bath at 70° C. for one hour and then cooled to room temperature over a 30 minute period. The hydrogen chloride and 49.55 gms of anhydrous HF were transferred over a period of 86 minutes to distilled water and the aqueous HF analyzed for arsenic, the results are reported in Table 1.

TABLE 1

| Procedure | % Cl$_2$ | % HCl | % KF | Temp °C. | Hold Time, Hours | ppm As* | % As Removed |
|---|---|---|---|---|---|---|---|
| Example 1 | 4.39 | 3.92 | None | 70 | 1.0 | 1.6 | 99.7 |
| Experiment A | 1.05 | None | None | 23 | 2.0 | 433.0 | 23.4 |
| Experiment B | 4.91 | None | None | 23 | 42.0 | 58 | 90.0 |
| Experiment C | None | 3.86 | 0.29 | 70 | 1.0 | 388.1 | 31.3 |

*ppm arsenic based on 100% HF.

From the above results, it is seen that the process of this invention (Example 1) provides anhydrous HF substantially free of arsenic within a short process time. It is also seen that the use of chlorine alone (Experiments A and B) will not provide anhydrous HF substantially free of arsenic unless the contact time of HF with the chlorine is well over 40 hours. Furthermore, the use of a combination of anhydrous hydrogen chloride and fluoride salt (Experiment C) will not, unless undesirably long contact time is used, provide a reasonable reduction in arsenic impurities.

EXAMPLE 2

0.13 gms of anhydrous potassium fluoride (0.25%) was charged to the cylinder of Example 1 before cooling. After cooling as in Example 1, 54.08 gms of commercial HF and 3.16 gms of chlorine (4.95%) were charged to the cylinder which was heated in a bath to 70° C. and maintained at this temperature for one hour without agitation. The cylinder was placed in a 23° C. water bath and allowed to stand for an additional 15 hours without agitation. The chlorine and 48.24 gms of anhydrous HF were transferred to distilled water and analyzed as reported in Example 1, the results of the analysis being reported below in Table 2.

In experiment D, a procedure similar to that of Example 2 was followed by first charging 0.15 gms of anhydrous potassium fluoride (0.26%) to the cylinder before cooling. After cooling, 58.87 gms of commercial anhydrous HF and 2.82 gms of chlorine (4.81%) were charged to the cylinder which was heated to 70° C. in a water bath, maintained at this temperature for one hour without agitation and then placed in a water bath at 23° C. and held for two hours without agitation. The chlorine and 54.78 gms of anhydrous HF were transferred to distilled water as described in Example 1 and the aqueous HF analyzed for arsenic, the results being reported in the table below.

TABLE 2

| Procedure | % Cl$_2$ | % KF | Temp. °C. | Hold Time, Hours | ppm As | % As Removed |
|---|---|---|---|---|---|---|
| Example 2 | 4.95 | 0.25 | 70 | 1 | 0.4 | 99.9 |
|  |  |  | 23 | 15 |  |  |
| Exprmt. D | 4.81 | 0.26 | 70 | 1 | 424.6 | 24.8 |
|  |  |  | 23 | 2 |  |  |

The data in the above table indicates that the combination treatment with chlorine and fluoride salt provides effective results even at about ambient temperature when given sufficient time for oxidation of the arsenic impurities to occur.

EXAMPLES 3 AND 4

Two procedures similar to Example 1 were followed except that different treatment temperatures were used. In Example 3, 1.26 gms of chlorine (2.27%, 15 psi) and 2.30 gms of anhydrous hydrogen chloride (4.14%, 36 psi) were added to 55.52 gms of commercial anhydrous HF in the cylinder. The mixture was held at 30° C. for one hour prior to transfer of the chlorine, hydrogen chloride and HF to distilled water for analysis of arsenic. In Example 4, chlorine (15 psi) and anhydrous hydrogen chloride (30 psi) were added to 59.50 gms of commercial anhydrous HF and the mixture in the cylinder was held at 0° C. for one hour prior to transfer of the chlorine, hydrogen chloride and HF to distilled water for analysis of arsenic. Table 3 below shows the analysis results of Examples 1, 3 and 4.

TABLE 3

| Example No. | Temp °C. | Hold Time, Hours | ppm As | % As Removed |
|---|---|---|---|---|
| 1 | 70 | 1.0 | 1.6 | 99.7 |
| 3 | 30 | 1.0 | 1.9 | 99.7 |
| 4 | 0 | 1.0 | 11.2 | 98.0 |

The data of Table 3 shows that the process of this invention is effective for substantially decreasing arsenic in anhydrous HF using short residence times at or below ambient temperatures as well as at elevated temperatures.

EXAMPLES 5-6

These examples demonstrate the use of fluoride salts in combination with chlorine and anhydrous hydrogen chloride to substantially reduce arsenic impurities in anhydrous HF.

In Example 5, the procedure of Example 1 was repeated using 0.15 gms of anhydrous potassium fluoride (0.26%), 57.64 gms of commercial anhydrous HF, 2.87 gms of chlorine (4.98%) and 1.91 gms of anhydrous hydrogen chloride (3.31%). The mixture was heated at 70° C. for 30 minutes and then cooled to 23° C. over 30 minutes. The chlorine, hydrogen chloride and HF (46.0 gms) were transferred to distilled water over 115 minutes and the aqueous HF analyzed for arsenic.

In Example 6, Example 1 was repeated using 0.50 gms of calcium fluoride (0.83%), 60.53 gms of commercial anhydrous HF, 1.63 gms of chlorine (2.69%, 15 psi) and 2.02 gms of anhydrous hydrogen chloride (3.34%, 31 psi). The mixture in the cylinder was heated at 30° C. for one hour. The chlorine, hydrogen chloride and the HF (52.17 gms) were transferred as in Example 1 to distilled water over 114 minutes and the aqueous HF analyzed for arsenic. The results of these analyses are shown in Table 4 below.

TABLE 4

| Example No. | % MF* | % Cl$_2$ | % HCl | Temp. °C. | ppm As | % As Removed |
|---|---|---|---|---|---|---|
| 5 | 0.26 (KF) | 4.98 | 3.31 | 70 | 0.6 | 99.9 |
| 6 | 0.83 (CaF$_2$) | 2.69 | 3.34 | 30 | 2.9 | 99.5 |

*MF = metal fluoride

EXAMPLE 7

The following example demonstrates the use of a chloride salt as a source of anhydrous hydrogen chloride and fluoride salt produced in situ by reaction of an anhydrous chloride salt with anhydrous HF.

56.03 gms of commercial anhydrous HF, 6.55 gms of anhydrous potassium chloride (11.69%) and 1.36 gms of chlorine (2.43%, 16 psi) were combined as described in Example 1 and heated at 30° C. for one hour. The chlorine and hydrogen chloride, generated in situ, and 38.97 gms of anhydrous HF were transferred in the vapor-phase over 135 minutes to distilled water as described in Example 1. The aqueous HF was analyzed for arsenic and found to contain 0.8 ppm which represents a 99.9% arsenic removal from anhydrous HF.

We claim:

1. A process for removing arsenic from arsenic contaminated anhydrous hydrogen fluoride which comprises intimately contacting said anhydrous hydrogen fluoride for an effective period of time and in effective amounts with elemental chlorine and a substance selected from the group consisting of anhydrous hydrogen chloride, a fluoride salt and mixtures thereof, and then recovering the anhydrous hydrogen fluoride having a substantially reduced amount of arsenic.

2. The process of claim 1 wherein the anhydrous hydrogen fluoride is contacted with elemental chlorine and anhydrous hydrogen chloride.

3. The process of claim 2 wherein the anhydrous hydrogen fluoride is also contacted with a fluoride salt.

4. The process of claim 3 wherein the fluoride salt is an alkali metal or alkaline earth metal fluoride.

5. The process of claim 1 wherein the anhydrous hydrogen fluoride is recovered by first distilling off chlorine and hydrogen chloride, if present, and then distilling off anhydrous hydrogen fluoride.

6. The process of claim 2 wherein the amounts of chlorine and hydrogen chloride are each at least about 0.5% based on the weight of anhydrous hydrogen fluoride.

7. The process of claim 6 wherein the amounts range from about 1 to about 4%.

8. The process of claim 3 wherein the fluoride salt is present in an amount ranging from 0.01 to 0.75% based on the weight of the anhydrous hydrogen fluoride.

9. The process of claim 2 wherein the hydrogen chloride is generated in situ from an inorganic acid chloride.

10. The process of claim 3 wherein the fluoride salt is generated in situ from the salt of a halogen other than fluorine.

11. A process for removing arsenic from arsenic contaminated anhydrous hydrogen fluoride which comprises intimately contacting said anhydrous hydrogen fluoride for an effective period of time, at a temperature ranging from ambient to about 30° C. with from about 1% to about 4% elemental chlorine and from about 1% to about 4% of anhydrous hydrogen chloride, said amounts based on the weight of anhydrous hydrogen fluoride, and then recovering the anhydrous hydrogen fluoride with a substantially reduced arsenic content by first distilling off chlorine and hydrogen chloride and then distilling off said anhydrous hydrogen fluoride.

12. The process of claim 11 wherein the anhydrous hydrogen fluoride is also contacted with an alkali metal or alkaline earth metal fluoride in an amount from about 0.01% to about 0.75% based on the weight of the anhydrous hydrogen fluoride.

* * * * *